United States Patent Office 2,710,881
Patented June 14, 1955

2,710,881
NEW SUBSTITUTED SEMICARBAZIDES

Ernst Schraufstaetter and Gerhard T. Domagk, Wuppertal-Elberfeld, Germany, assignors to Schenley Industries, Inc., New York, N. Y., a corporation of Delaware No Drawing. Application July 24, 1953,
Serial No. 370,217

Claims priority, application Germany
September 23, 1952

7 Claims. (Cl. 260—554)

This invention relates to new substituted semicarbazides. It more particularly relates to $N^1$-dihalogenoacetyl-$N^1$-phenylsemicarbazides, which have been found to exhibit an excellent activity in combatting the effects of Bang's bacillus, i. e., *Brucella abortus*.

The new $N^1$-dihalogenoacetyl-$N^1$-phenylsemicarbazides have proven highly effective in preventing brucellosis and exhibit a greater potency than the sulfonamides, while having substantially the same compatibility as these compounds.

The $N^1$-dihalogenoacetyl-$N^1$-phenylsemicarbazides in accordance with the invention have the following general formula:

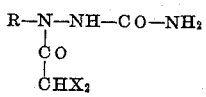

in which R represents a phenyl radical which may be substituted or unsubstituted, and X is halogen. The two halogen atoms represented by X may be the same or different halogen atoms.

The phenyl radical represented by R may be substituted as, for example, with one or more halogen, hydroxy, alkoxy, nitro, amino, acylamino, carboxyl, alkyl, alkylmercapto and alkylsulfonyl radicals.

The new $N^1$-dihalogenoacetyl-$N^1$-phenylsemicarbazides may be prepared by condensation of a 1-phenylsemicarbazide with a dihalogenoacetyl chloride in a manner similar to that previously used for the production of similar compounds. The starting 1-phenylsemicarbazides may be produced by reacting the corresponding phenylhydrazine with an alkali metal cyanide such as potassium cyanide in dilute acetic acid.

It is also possible to produce the starting 1-phenylsemicarbazides by reacting a solution of an inorganic acid salt of the corresponding phenylhydrazine with an aqueous solution of an alkali metal cyanate, and preferably potassium cyanate.

The reactions involved, including the preparation of the starting phenylsemicarbazide, using potassium cyanide, may be represented as follows:

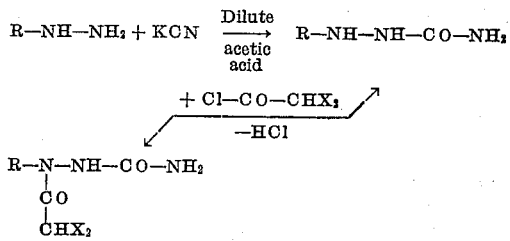

in which R is a phenyl radical which may be substituted or unsubstituted, and X is halogen. The two halogen atoms represented by $X_2$ may be the same or different.

The reaction of the 1-phenylsemicarbazides is preferably effected in an inert solvent and preferably in the presence of a halogen halide acceptor, as, for example, a tertiary amine or sodium bicarbonate.

In place of the dihalogenoacetyl chloride, other dihalogenoacetyl halides, dihalogenoacetic acids or functional derivatives thereof, such as anhydrides and esters, may be used.

The $N^1$-dihalogenoacetyl-$N^1$-phenylsemicarbazides in accordance with the invention are preferably $N^1$-dichloroacetyl-$N^1$-phenylsemicarbazides, though compounds having different dihalogenoacetyl radicals as, for example, dibromoacetyl and chlorobromoacetyl radicals are within the scope of the invention.

After the compounds have been produced in the manner indicated above, it is possible to subsequently modify the substituents attached to the phenyl radical and/or to introduce new substituents.

The following examples are given by way of illustration and not limitation:

EXAMPLE 1

Twenty-four grams of 1-phenylsemicarbazide are heated to boiling in 100 cc. of acetone and 24 grams of dichloroacetyl chloride are added in drops. After further boiling for a short period, the solution is poured into 200 cc. of water and allowed to crystallize. The substance formed is suction-filtered and washed, first with dilute acetone, and thereafter with pure acetone. By recrystallizing from alcohol (70 per cent.) $N^1$-phenyl-$N^1$-dichloroacetylsemicarbazide is obtained in colorless needles melting at 180° C. with decomposition.

The same compound is obtained by carrying out the reaction with cooling in the presence of a tertiary amine.

EXAMPLE 2

Ten and eight-tenths grams of p-methoxyphenylsemicarbazide is reacted in 100 cc. of acetone with 9 grams of dichloroacetyl chloride and refluxed for 30 minutes. The solution is poured into water, suction-filtered, and recrystallized from alcohol. The resulting $N^1$-p-methoxyphenyl-$N^1$-dichloroacetylsemicarbazide melts at 192° C. with decomposition.

EXAMPLE 3

Nine and eight-tenths grams of m-nitrophenylsemicarbazide are reacted in acetone with 7.5 grams of dichloroacetyl chloride and refluxed for a short time. Upon addition of water $N^1$-m-nitrophenyl-$N^1$-dichloracetylsemicarbazide crystallizes. After recrystallizing from alcohol the compound melts at 193° C. with decomposition.

EXAMPLE 4

Sixteen and four-tenths grams of 3-methylphenylsemicarbazide are heated to boiling in 100 cc. of acetone, 15 grams of dichloroacetyl chloride are added in drops, and heating is continued for a short time. The solution is mixed with water and allowed to crystallize. After recrystallizing from alcohol (70 per cent.) the resulting $N^1$-dichloroacetyl-$N^1$-3-methylphenylsemicarbazide has the melting point 179° C.

EXAMPLE 5

Nine and eight-tenths grams of p-nitrophenylsemicarbazide are suspended in 30 cc. of toluene and 7.5 grams of dichloroacetyl chloride are added. The reaction mixture is heated on the water bath for 12 hours, the mass being stirred occasionally. After cooling, the mixture is suction-filtered, the precipitate dried and boiled with water. The filtrate is allowed to crystallize, suction-filtered, and dried. The dry substance is contacted with acetone and a certain quantity of starting material remains undissolved. The acetone solution is filtered and evaporated, and the residue recrystallized from water. The $N^1$ - dichloroacetyl-$N^1$-4-nitrophenylsemicarbazide thus obtained melts at 187° C.

EXAMPLE 6

Fifteen grams of 1-phenylsemicarbazide are boiled in 100 cc. of acetone, and 22 grams of dibromoacetyl bromide are added in drops. After boiling further for a short time, the reaction mixture is poured into water and allowed to crystallize. After recrystallizing from alcohol (70 per cent.), the $N^1$-dibromoacetyl-$N^1$-phenyl-semicarbazide thus obtained melts at 172° C.

EXAMPLE 7

Twelve and five-tenths grams of 4-chlorophenylsemicarbazide are heated to boiling in 100 cc. of acetone. Ten grams of dichloroacetyl chloride is then added, followed by 1 hour of boiling. The reaction mixture is thereafter poured into water, which causes the unchanged starting material to precipitate. The precipitate is then separated. Concentration of the mother liquor and recrystallization from 50% alcohol yield $N^1$-dichloroacetyl-$N^1$-4-chlorophenylsemicarbazide, which melts at 198° C.

EXAMPLE 8

4-carbethoxyphenylsemicarbazide, having a melting point of 210° C. is prepared by reacting the corresponding aryl hydrazine with potassium cyanide in dilute acetic acid. Fourteen grams of this 4-carbethoxyphenyl-semi-carbazide is heated to boiling in 100 cc. of acetate. After adding 10 grams of dichloroacetyl chloride, boiling is continued for another 15 minutes. The charge is then mixed with water, allowed to crystallize, vacuum-filtered, and recrystallized from 50% alcohol. The resultant $N^1$-dichloroacetyl - $N^1$ - 4 - carbethoxyphenylsemicarbazide of the formula:

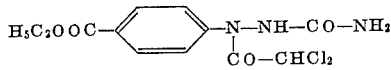

melts at 180° C.

EXAMPLE 9

Eleven and four-tenths grams of 4-carboxyphenylsemicarbazide having a melting point of 242° C. with decomposition which has been prepared from the corresponding aryl hydrazine by reaction with potassium cyanide and dilute acetic acid is heated to boiling in 150 cc. of acetone. Then 9 grams of dichloroacetyl chloride is added, and boiling is continued for 1 hour. Subsequently, water is added for precipitation; the precipitate is filtered off by suction and recrystallized from 70% alcohol. There results $N^1$-dichloroacetyl-$N^1$-4-carboxyphenylsemicarbazide, which melts with decomposition at 252° C.

EXAMPLE 10

Example 8 is repeated, using $N^1$-4-acethylaminophenyl-semicarbazide instead of $N^1$-4-carbethoxyphenylsemi-carbazide. $N^1$-dichloroacetyl - $N^1$-4 - acetylaminophenyl-semicarbazide is obtained, which melts at 229° C. after recrystallization from water. The 4-acetylaminophenyl-semicarbazide has a melting point of 230° C. with decomposition and may be obtained from the corresponding aryl hydrazine by reaction with potassium cyanide and dilute acetic acid.

The dihalogenoacetyl radical is critical to the pharmaceutical properties of the new compounds in accordance with the invention and corresponding monohalogeno-acetyl derivatives will not exhibit the excellent activity of the new dihalogeno compounds.

In accordance with established practice for evaluation the following experiment illustrates the advantageous properties of the novel compounds.

EXAMPLE 11

Sixty mice were infected by injection with 0.5 cc. of a suspension of a culture of Bang's bacillus 48 hours old. The mice were divided into three groups of 20 mice each. The first group was a control group, the second group was treated with $N^1$-chloroacetyl-$N^1$-phenylsemi-carbazide, and the third group was treated with $N^1$-dichloroacetyl - $N^1$ - phenylsemicarbazide in accordance with the invention.

Half of group 2 was treated by injection and half per os. The dosage amounts were 0.2 cc. to two animals in each half, 0.3 cc. to two animals in each half, 0.5 cc. to two animals in each half, 0.8 cc. to two animals in each half, and 1.0 cc. to two animals in each half.

The animals of group 3 were treated in the identical manner as the animals of group 2, using $N^1$-dichloroacetyl-$N^1$-phenylsemicarbazide in place of the $N^1$-chloroacetyl-$N^1$-phenylsemicarbazide. The results are indicated in the table below:

Table

| Group | Substance | Number of animals | Alive 48 hrs. after infection | Alive 10 days after infection |
|---|---|---|---|---|
| 1 | (Control animals) none. | 20 | 6 | 0 |
| 2 | $N^1$-Chloroacetyl-$N^1$-phenylsemicarbazide. | 20 | 11 | 6 |
| 3 | $N^1$-Dichloroacetyl-$N^1$-phenylsemicarbazide. | 20 | 20 | 19 |

The control animals received no treatment and all died within 10 days after infection. Fourteen of the animals of group 2 died, while only one animal from group 1 died.

We claim:

1. As a new chemical compound, $N^1$-dichloroacetyl-$N^1$-phenylsemicarbazide.

2. As a new chemical compound, $N^1$-dichloroacetyl-$N^1$-3-methylphenylsemicarbazide.

3. As a new chemical compound, $N^1$-dichloroacetyl-$N^1$-4-nitrophenylsemicarbazide.

4. As a new chemical compound, $N^1$-dibromoacetyl-$N^1$-phenylsemicarbazide.

5. As a new chemical compound, $N^1$-dichloroacetyl-$N^1$-4-chlorophenylsemicarbazide.

6. As a new chemical compound an $N^1$-dihalogeno-acetyl-phenylsemicarbazide having the formula:

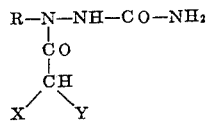

in which R is a member selected from the group consisting of phenyl, halogeno phenyl, lower alkoxy phenyl, nitrophenyl, amino phenyl, lower acylamino phenyl, carboxy phenyl, lower alkyl-carboxy phenyl and lower alkyl phenyl radicals and X and Y are each a member selected from the group consisting of chlorine and bromine.

7. As a new chemical compound an $N^1$-dichloroacetyl $N^1$-phenylsemicarbazide having the formula:

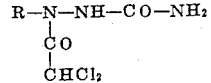

in which R is a member selected from the group consisting of phenyl, halogeno phenyl, lower alkoxy phenyl, nitrophenyl, amino phenyl, lower acylamino phenyl, carboxyl phenyl, lower alkyl-carboxy phenyl and lower alkyl phenyl radicals.

No references cited.